United States Patent [19]

Chen

[11] Patent Number: 5,507,413

[45] Date of Patent: Apr. 16, 1996

[54] AUTOMATIC LIQUID SOAP DISPENSER

[75] Inventor: Ching-Shih Chen, Taipei, Taiwan

[73] Assignee: Shih Kong Inc., Taipei, Taiwan

[21] Appl. No.: 297,284

[22] Filed: Aug. 29, 1994

Related U.S. Application Data

[63] Continuation-in-part of Ser. No. 134,240, Oct. 8, 1993, Pat. No. 5,344,047.

[51] Int. Cl.⁶ ..................................................... B67D 5/08
[52] U.S. Cl. ........................... 222/63; 4/605; 4/903; 222/181.2; 222/333; 222/386
[58] Field of Search .................................. 222/52, 60, 63, 222/181, 185, 333, 340, 386; 4/605, 903

[56] References Cited

U.S. PATENT DOCUMENTS

| | | | |
|---|---|---|---|
| 2,898,009 | 8/1959 | Green | 222/308 |
| 3,089,618 | 5/1963 | Forsyth | 222/60 |
| 4,722,372 | 2/1988 | Hoffman et al. | 222/52 X |
| 4,938,384 | 7/1990 | Pilolla et al. | 222/52 |
| 4,946,070 | 8/1990 | Albert et al. | 222/52 |
| 4,967,935 | 11/1990 | Celest | 222/63 |
| 5,105,992 | 4/1992 | Fender | 222/185 |
| 5,213,566 | 5/1993 | Weissenburger | 222/386.5 X |
| 5,215,216 | 6/1993 | Van Marcke | 222/1 |
| 5,249,718 | 10/1993 | Muderlak | 222/642 |
| 5,271,528 | 12/1993 | Chien | 222/63 |
| 5,301,852 | 4/1994 | Mancini | 222/340 X |
| 5,344,047 | 9/1994 | Chen | 222/63 |

Primary Examiner—Joseph A. Kaufman
Attorney, Agent, or Firm—Skjerven, Morrill, MacPherson, Franklin & Friel

[57] ABSTRACT

An automatic liquid soap dispenser includes a liquid soap container which receives liquid soap therein and which has a bottom wall that is formed with an outlet port. A tubular body is secured to a bottom surface of the bottom wall such that a through-hole at a closed rear portion of the tubular body is aligned with the outlet port. The closed rear portion of the tubular body is further formed with an upright soap outlet adjacent to the through-hole. A movable blocking member is provided adjacent to said closed rear portion and is movable to block and unblock the through-hole so as to control the flow of the liquid soap through the soap outlet. The plunger has a piston which extends fittingly and movably into the tubular body via an open front portion of the latter, and a flexible shaft portion connected to the piston. A driving unit is activated by a detecting unit upon detection of a target. The shaft portion of the plunger is coupled eccentrically to the driving unit so that activation of the driving unit results in reciprocal linear movement of the piston within the tubular body to dispense a predetermined amount of the liquid soap through the soap outlet. A switch unit is activated when the piston of the plunger completes one cycle of the reciprocal linear movement and deactivates the driving unit when activated.

11 Claims, 6 Drawing Sheets

AUTOMATIC LIQUID SOAP DISPENSER

CROSS-REFERENCE TO RELATED APPLICATION

This is a continuation-in-part application of U.S. application Ser. No. 08/134,240, filed on Oct. 08, 1993 now U.S. Pat. No. 5,349,047.

BACKGROUND OF THE INVENTION

1. Field of the Invention

The invention relates to a liquid soap dispenser, more particularly to an automatic liquid soap dispenser which is capable of supplying a predetermined amount of liquid soap when activated and which can prevent leakage of the liquid soap effectively.

2. Description of the Related Art

Liquid soap dispensers are installed in public toilets and deliver small amounts of liquid soap when operated. A first type of conventional liquid soap dispenser requires manual operation of the same before liquid soap can be delivered to the hands of a user. Liquid soap dispensers which belong to this type are inconvenient to use and are unsanitary since physical contact therewith may result in the contraction of germs.

A second type of conventional liquid soap dispenser is capable of delivering automatically small amounts of liquid soap onto the hands of a user without manual operation thereof or physical contact therewith. Liquid soap dispensers which belong to this type usually employ an infrared unit to control the dispensing of liquid soap automatically. Upon detection of a target, such as the user's hands, the infrared unit activates a pump actuating unit to activate correspondingly a spring-type pump unit in order to dispense a predetermined amount of liquid soap from a soap container. This type of liquid soap dispenser is convenient to use and prevents the dispensing of excessive amounts of liquid soap.

Prolonged use of liquid soap dispensers which belong to the second type, however, results in several drawbacks. For example, fatigue of the spring-type pump unit occurs, thereby affecting the ability of the pump unit to return to a fully-closed position and thereby diminishing the amount of liquid soap dispensed by the dispenser. Furthermore, leakage of the liquid soap can occur since the pump unit is unable to return to the fully-closed position.

SUMMARY OF THE INVENTION

The applicant of the present invention has a U.S. patent application, namely application Ser. No. 08/134,240, now U.S. Pat. No. 5,349,047, which discloses an automatic liquid soap dispenser that is constructed to solve the problems associated with the aforementioned conventional liquid soap dispenser. The object of the present invention is the same as that of the co-pending U.S. patent application, i.e. to provide an automatic liquid soap dispenser which is capable of supplying a predetermined amount of liquid soap when activated and which can prevent the leakage of liquid soap effectively.

Accordingly, the automatic liquid soap dispenser of the present invention includes a liquid soap container, a flow control unit and an actuating unit. The liquid soap container confines a hollow space for receiving liquid soap therein and has a bottom wall which is formed with an outlet port and which has a bottom surface. The flow control unit includes a tubular body which has an open front portion and a closed rear portion that is formed with adjacent first and second annular outward projections which respectively confine a through-hole communicated with an interior of the tubular body. The tubular body is secured to the bottom surface of the bottom wall of the liquid soap container such that the through-hole of the first annular outward projection is aligned with the outlet port. The closed rear portion of the tubular body is further formed with an upright soap outlet which is disposed adjacent to and communicated with the through-hole of the second annular outward projection. The second annular outward projection has a lower end which is formed with a valve seat, and a movable blocking member which is disposed movably within the second annular outward projection and which is movable between a first position, wherein the blocking member rests on the valve seat so as to block the through-hole of the second annular outward projection, and a second position, wherein the blocking member moves away from the valve seat so as to unblock the through-hole of the second annular outward projection, thereby controlling flow of the liquid soap through the soap outlet. A plunger has a piston which extends fittingly and movably into the tubular body via the open front portion, and a flexible shaft portion which has a first end connected to the piston and a second end. The actuating unit is mounted on the liquid soap container and includes a detecting means which is used for detecting a target. A driving unit is connected to the detecting means and is activated by the detecting means upon detection of the target. The second end of the shaft portion of the plunger is coupled eccentrically to the driving unit so that activation of the driving unit results in reciprocal linear movement of the piston of the plunger within the tubular body, thereby moving the blocking member from the first position to the second position and dispensing a predetermined amount of the liquid soap through the soap outlet. A switch means is connected to the driving unit and is used for deactivating the driving unit when the piston of the plunger completes one cycle of reciprocal linear movement.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Referring to FIGS. 1 to 4, the preferred embodiment of an automatic liquid soap dispenser according to the present invention is shown to comprise a liquid soap container 10, an actuating unit 20, and a flow control unit 30.

Figure 1:
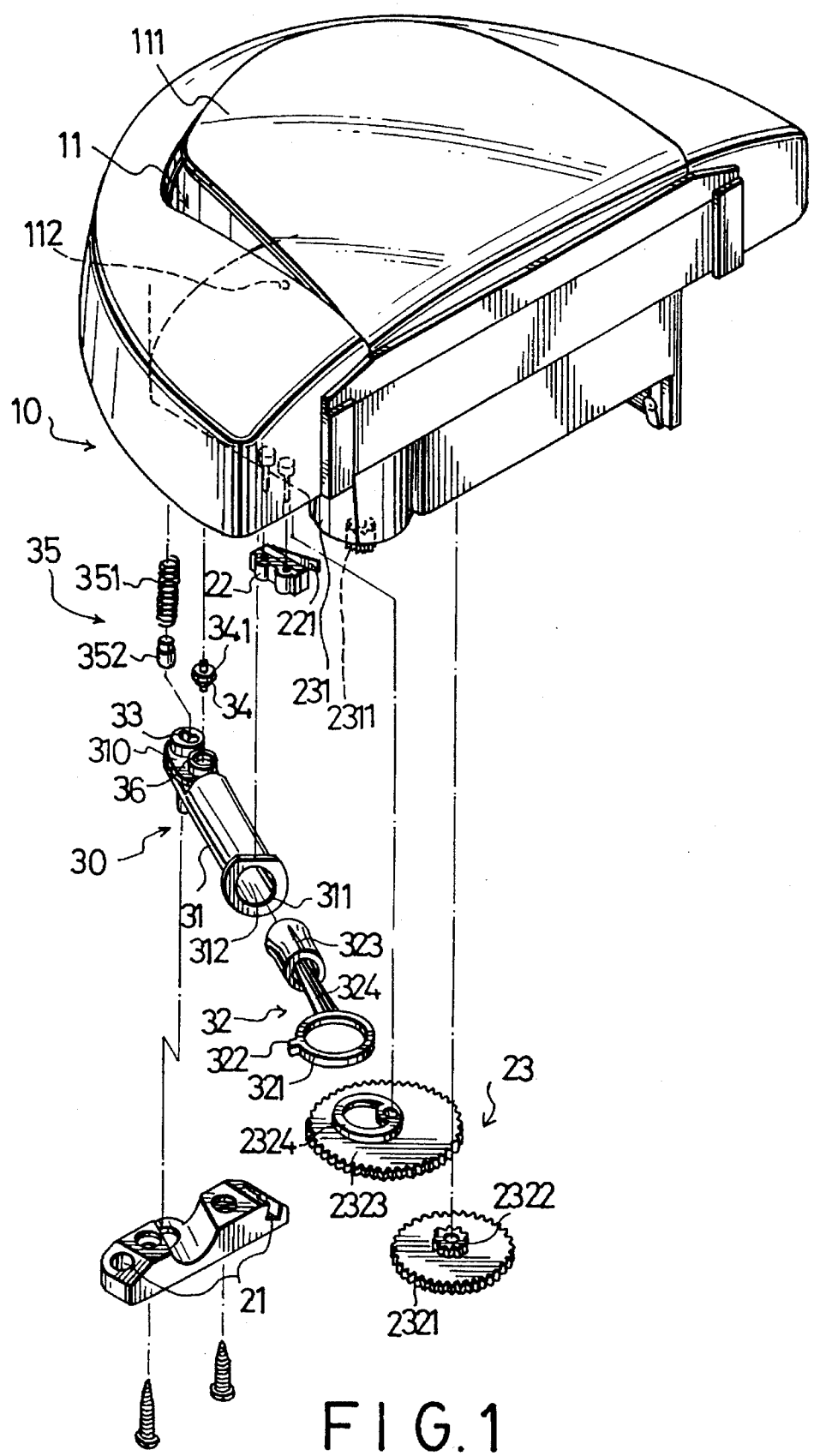
FIG. 1 is an exploded view of the preferred embodiment of an automatic liquid soap dispenser according to the present invention.
Figure 2:
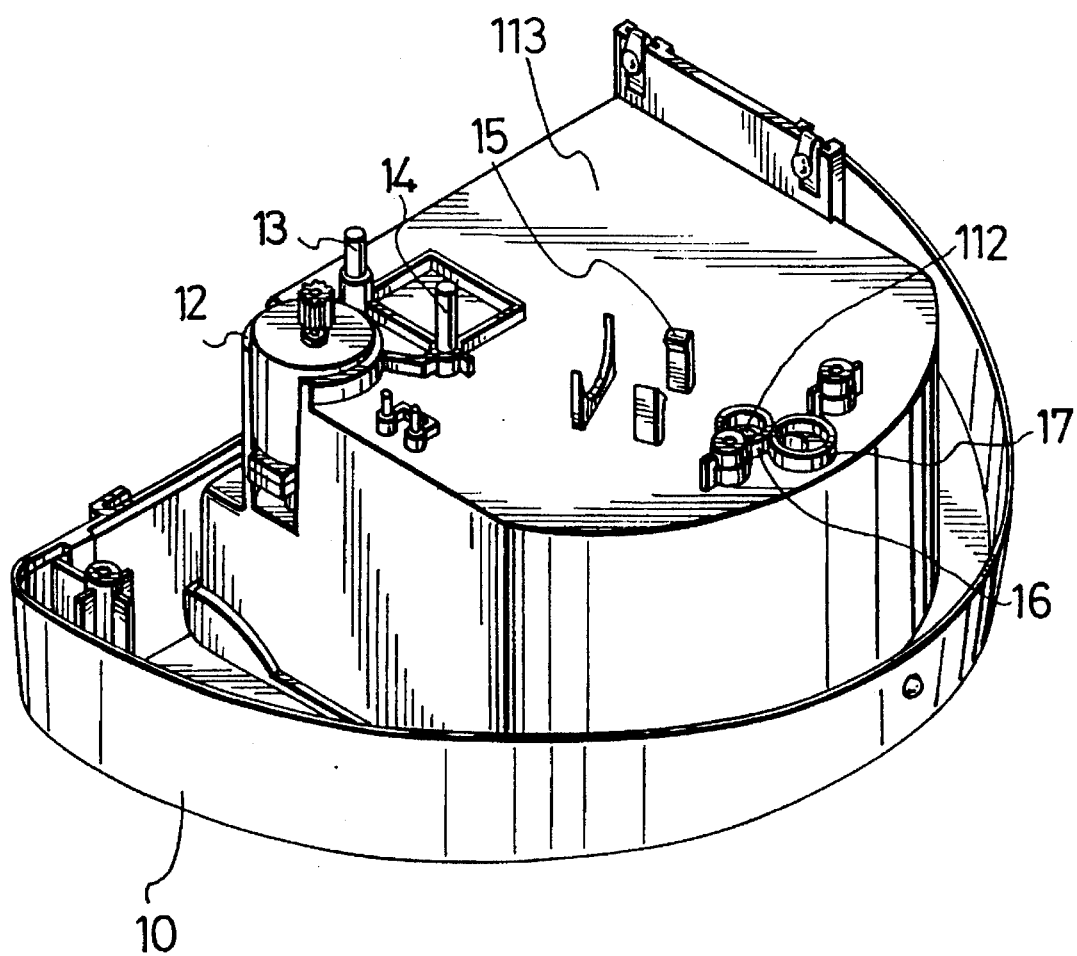
FIG. 2 is a rear perspective view of a soap container of the preferred embodiment.
Figure 3:
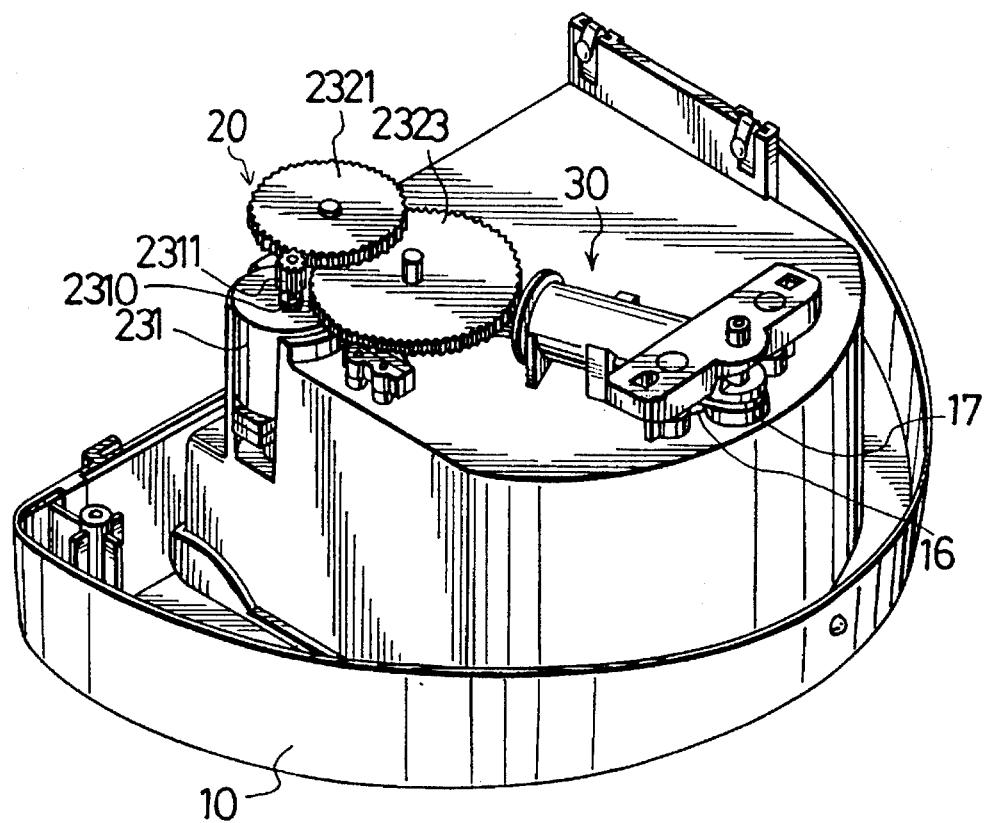
FIG. 3 is a rear perspective view which illustrates the assembly of the preferred embodiment.

Referring to FIGS. 1 and 2, the soap container 10 confines a hollow space 11 for receiving liquid soap therein and has an open top via which the hollow space 11 is accessible. A cover plate 111 is mounted pivotally on the soap container 10 and normally closes the open top of the soap container 10. Liquid soap is poured into the hollow space 11 via the open top of the soap container 10 when the cover plate 111 is pivoted upward to open the open top. The soap container 10 has a bottom wall 113 which is formed with an outlet port 112 to permit the flow of liquid soap out of the hollow space 11. The bottom wall 113 has a bottom surface which is formed with a retaining groove 12, first and second gear axles 13, 14 disposed adjacent to the retaining groove 12 on one side of the latter, a pair of opposed retaining hooks 15 on one side of the second gear axle 14, and adjacent first and second ring projections 16, 17. The first ring projection 16 is disposed around the outlet port 112.

Referring to FIGS. 1 to 5 and FIG. 9, the actuating unit 20 includes a detecting means 24, a driving unit 23, and a switch means 22. The driving unit 23 includes a motor 231, a speed changing gear set and a driving gear 2323. The switch means 22 is a contact switch which has a movable switch contact 221. The switch means 22 is used to control the operation of the motor 231. Operation of the motor 231 is initiated by the detecting means 24 and is terminated by the switch means 22. In the present embodiment, the detecting means 24 is an infrared unit. The motor 231 has an output shaft 2310. The speed changing gear set includes a first small gear wheel 2311 and a large gear wheel 2321. The first small gear wheel 2311 is mounted on the output shaft 2310 of the motor 231. The large gear wheel 2321 is secured rotatably on the first gear axle 13 and meshes with the first small gear wheel 2311. A second small gear wheel 2322 is formed coaxially and integrally on one side of the large gear wheel 2321 so as to rotate with the large gear wheel 2321. The driving gear 2323 is secured rotatably on the second gear axle 14 and meshes with the second small gear wheel 2322. Therefore, rotation of the output shaft 2310 of the motor 231 can result in corresponding rotation of the driving gear 2323. The driving gear 2323 has one side which is formed with an eccentric annular projection 2324. The switch means 22 is fixed to the bottom surface of the bottom wall 113 of the soap container 10 such that the movable switch contact 221 is disposed on one side of the second gear axle 14.

Figure 4:
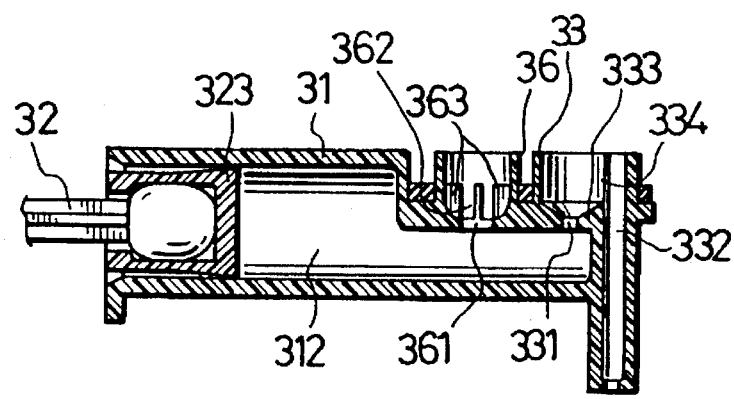
FIG. 4 is a sectional view of a tubular body and a portion of a plunger of a flow control unit of the preferred embodiment.
Figure 5:
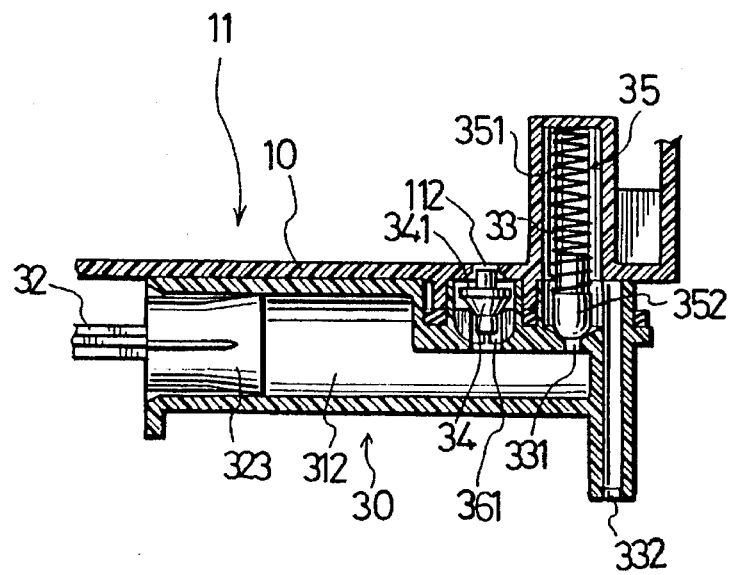
FIG. 5 is a fragmented sectional view of the preferred embodiment when a movable blocking member of the flow control unit is located in a first position.
Figure 6:
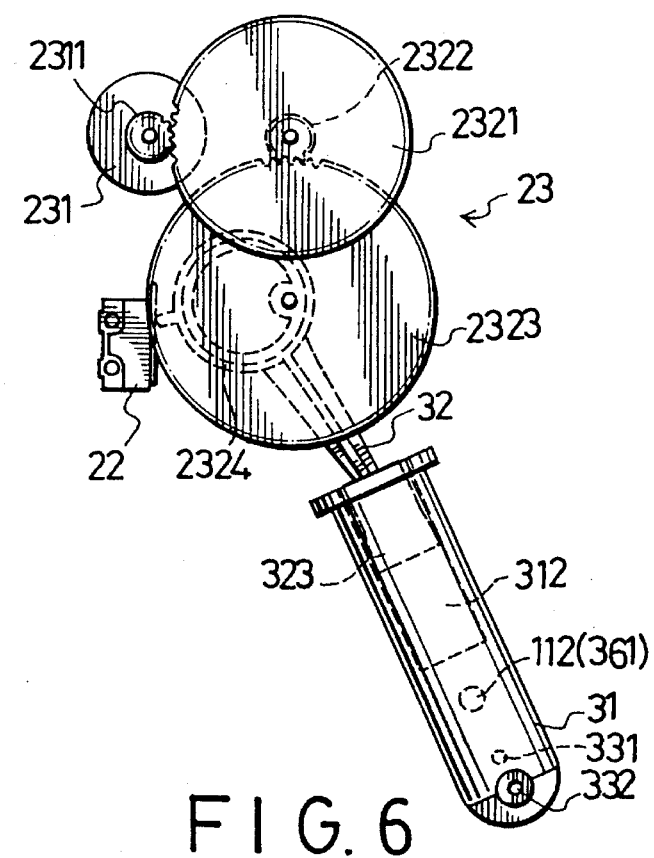
FIG. 6 illustrates the relationship between the flow control unit and an actuating unit of the preferred embodiment when the preferred embodiment is in a first operating state.

Referring to FIGS. 1, 4 and 5, the flow control unit 30 includes a tubular body 31, a plunger 32, a movable first blocking member 35 and a second blocking member 34. The tubular body 31 has an open front portion 311 and a closed rear portion which is formed with a longitudinal cut-out, thereby forming an indented section 310 thereat. The indented section 310 is formed with adjacent first and second annular outward projections 36, 33 that respectively confine a through-hole 361, 331 communicated with an interior of the tubular body 31. The first and second annular outward projections 36, 33 extend fittingly into a respective one of the first and second ring projections 16, 17 at the bottom wall 113 of the soap container 10 when the tubular body 31 is secured onto the latter by means of a retaining member 21. The first annular outward projection 36 has a lower portion which is formed with four angularly spaced and inwardly projecting radial ribs 363 (only two are shown in FIG. 4). A passage 362 is defined between two adjacent radial ribs 363. The indented section 310 of the tubular body 31 is further formed with an upright soap outlet 332 which is disposed adjacent to the through-hole 331 of the second annular outward projection 33. The second annular outward projection 33 has a lower end which is formed with an inwardly projecting annular valve seat 333. An axially extending slit 334 is disposed above the valve seat 333 and communicates the through-hole 331 with the soap outlet 332. The second blocking member 34 is disposed movably within the first annular outward projection 36 and has a plug surface 341. The plug surface 341 of the second blocking member 34 has a diameter greater than that of the outlet port 112 of the soap container 10. It should be noted that the second blocking member 34 normally rests on the ribs 363. At this stage, liquid soap in the hollow space 11 of the soap container 10 will flow into the tubular body 31 via the passages 362 in the through-hole 361 confined by the first annular outward projection 36. The movable blocking member 35 is disposed movably within the second annular outward projection 33 and includes a sealing block 352 which is movable between a first position, wherein the sealing block 352 rests on the valve seat 333 so as to block the through-hole 331 of the second annular outward projection 33, and a second position, wherein said sealing block 352 moves away from the valve seat 333 so as to unblock the through-hole 331 of the second annular outward projection 33, thereby controlling flow of the liquid soap through the soap outlet 332. The movable blocking member 35 further includes a resilient element 351 which is interposed between the sealing block 352 and the bottom wall 113 of the soap container 10 and which normally biases the sealing block 352 so as to retain the latter in the first position. In the present embodiment, the resilient element 351 is a compression spring, while the sealing block 352 is a cylindrical pin.

The plunger 32 is made of a flexible plastic material and has a piston 323 which extends fittingly and movably into the tubular body 31 via the open front portion 311 of the latter. The plunger 32 further has a flexible shaft portion 324 which interconnects the piston 323 and a retaining ring 321. The retaining ring 321 is sleeved around the eccentric annular projection 2324 of the driving gear 2323 and is formed with a switch actuator 322 which projects radially outward therefrom. Whenever the driving gear 2323 completes one revolution, the switch actuator 322 presses against the movable switch contact 221 of the switch means 22 so as to activate the latter.

Figure 7:
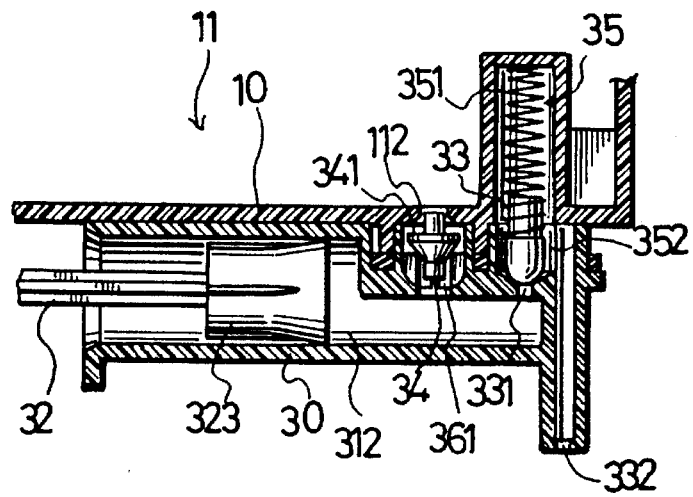
FIG. 7 is a fragmented sectional view of the preferred embodiment when the movable blocking member of the flow control unit is located in a second position.

Referring to FIG. 3 and FIGS. 5 to 10, upon detection of a target, such as the hands of a user, the detecting means 24 activates the motor 231, thereby causing the driving gear 2323 to rotate. Clockwise rotation of the driving gear 2323 causes the piston 323 of the plunger 32 to move linearly within the tubular body 31 from the position shown in FIG. 5 to the position shown in FIG. 10. Under this condition, the piston 323 forces the liquid soap inside the tubular body 31 to move the sealing block 352 from the first position to the second position, thereby permitting the flow of liquid soap in the tubular body 31 through the soap outlet 332 via the slit 334, as shown in FIG. 7. As the piston 323 of the plunger 32 moves from the position shown in FIG. 5 to the position shown in FIG. 10, the second blocking member 34 is also forced to move upwardly such that the plug surface 341 abuts against the bottom wall surface of the bottom wall 113 of the soap container 10, thereby blocking the outlet port 112 of the soap container 10, as shown in FIG. 7.

Figure 8:
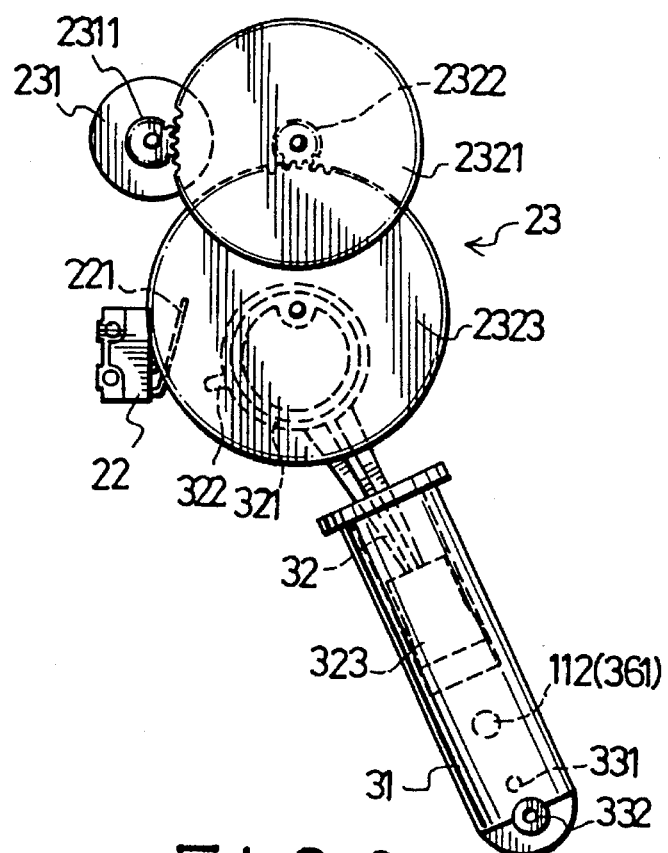
FIG. 8 illustrates the relationship between the flow control unit and the actuating unit of the preferred embodiment when the preferred embodiment is in a second operating state.
Figure 9:
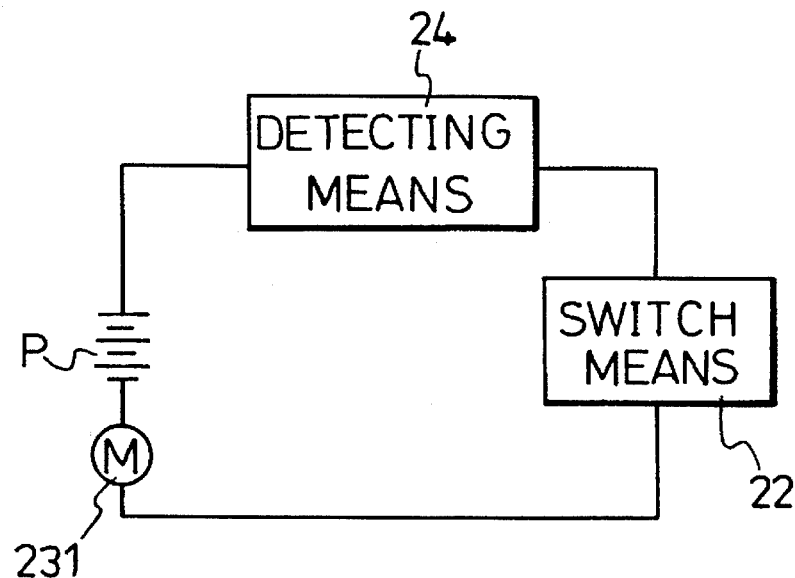
FIG. 9 is a simplified circuit diagram of the electrical components of the preferred embodiment.
Figure 10:
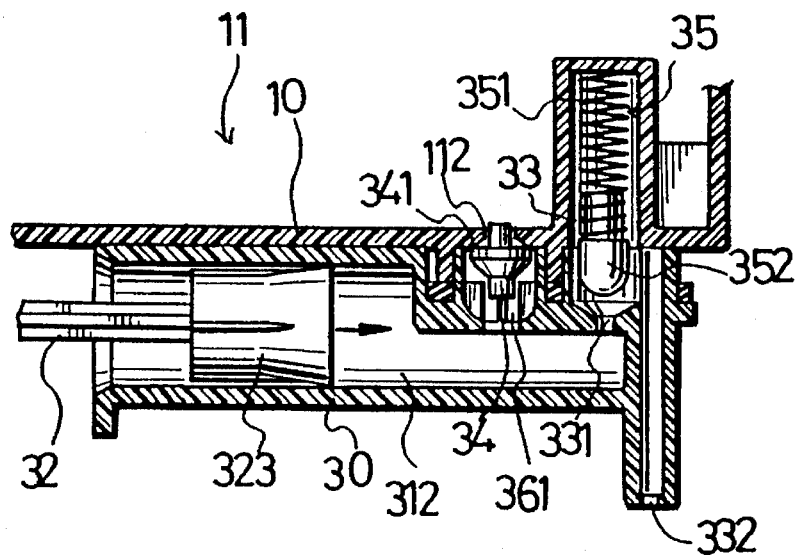
FIG. 10 is a fragmented sectional view of the preferred embodiment when a piston of the plunger of the flow control unit is moving within the tubular body.

When the piston 323 reaches the position shown in FIGS. 8 and 10, further clockwise rotation of the driving gear 2323 causes the piston 323 of the plunger 32 to move within the tubular body 31 from the position shown in FIG. 10 back to the position shown in FIG. 5. Under this condition, the piston 323 moves away from the closed rear portion of the tubular body 31. The sealing block 352 within the second annular outward projection 33 blocks the valve seat 333 to prevent the flow of liquid soap through the slit 334, as shown in FIG. 10. At the same time, the second blocking member 34 rests on the ribs 363 and liquid soap flows from the soap container 10 and into the tubular body 31 via the passages 362 in the through-hole 361 of the first annular outward projection 36. Eventually, the switch actuator 322 on the retaining ring 321 of the plunger 32 presses against the movable switch contact 221 of the switch means 22 so as to activate the latter. At this instant, the switch means 22 disrupts the flow of current from a power source (P) to the motor 231, thereby deactivating the motor 231. It should be noted that as the driving gear 2323 completes one revolution, the piston 323 of the plunger 32 completes one cycle of reciprocal linear movement within the tubular body 31.

It has thus been shown that the present invention is capable of supplying a predetermined amount of liquid soap when activated. Furthermore, the provision of the ball valve unit can prevent the leakage of liquid soap effectively.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An automatic liquid soap dispenser, comprising:

a liquid soap container which confines a hollow space for receiving liquid soap therein, said soap container having a bottom wall which is formed with an outlet port, said bottom wall having a bottom surface;

a flow control unit including
a tubular body having an open front portion and a closed rear portion which is formed with adjacent first and second annular outward projections that respectively confine a through-hole communicated with an interior of said tubular body, said tubular body being secured to said bottom surface of said bottom wall of said liquid soap container such that said through-hole of said first annular outward projection is aligned with said outlet port, said closed rear portion of said tubular body being further formed with an upright soap outlet disposed adjacent to and communicated with said through-hole of said second annular outward projection, said second annular outward projection having a lower end which is formed with a valve seat, and a movable blocking member disposed movably within said second annular outward projection and movable between a first position, wherein said blocking member rests on said valve seat so as to block said through-hole of said second annular outward projection, and a second position, wherein said blocking member moves away from said valve seat so as to unblock said through-hole of said second annular outward projection, thereby controlling flow of said liquid soap through said soap outlet; and
a plunger having a piston which extends fittingly and movably into said tubular body via said open front portion, and a flexible shaft portion which has a first end connected to said piston and a second end; and
an actuating unit mounted on said liquid soap container and including
means for detecting a target;
a driving unit connected to said detecting means and activated by said detecting means upon detection of said target;
said second end of said shaft portion of said plunger being coupled eccentrically to said driving unit so that activation of said driving unit results in reciprocal linear movement said piston of said plunger within said tubular body, thereby moving said blocking member from said first position to said second position and dispensing a predetermined amount of said liquid soap through said soap outlet; and
switch means, connected to said driving unit, for deactivating said driving unit when said piston of said plunger completes one cycle of said reciprocal linear movement.

2. The automatic liquid soap dispenser as claimed in claim 1, wherein said detecting means is an infrared unit.

3. The automatic liquid soap dispenser as claimed in claim 1, wherein said first annular outward projection has a lower portion which is formed with a plurality of angularly spaced and inwardly projecting radial ribs, said first annular outward projection being provided with a second blocking member therein, said second blocking member being movable to block and unblock said outlet port so as to control flow of said liquid soap into said tubular body.

4. The automatic liquid soap dispenser as claimed in claim 1, wherein said driving unit of said actuating unit includes a motor with an output shaft, a speed changing gear set driven rotatably by said output shaft of said motor, and a driving gear driven rotatably by said speed changing gear set, said second end of said shaft portion of said plunger being connected eccentrically to said driving gear.

5. The automatic liquid soap dispenser as claimed in claim 4, wherein said switching means is a contact switch which is disposed on one side of said driving gear and which is activated by said second end of said shaft portion when said driving gear completes one revolution, said contact switch deactivating said driving unit when activated.

6. The automatic liquid soap dispenser as claimed in claim 5, wherein said driving gear has one side which is formed with an eccentric annular projection, and said second end of said shaft portion of said plunger is formed with a retaining ring that is sleeved around said eccentric annular projection.

7. The automatic liquid soap dispenser as claimed in claim 6, wherein said retaining ring is formed with a switch actuator which projects radially outward therefrom and which presses against said contact switch so as to activate said contact switch when said driving gear completes one revolution.

8. The automatic liquid soap dispenser as claimed in claim 4, wherein said-speed changing gear set includes a first small gear wheel which is secured on said output shaft of said motor, a large gear wheel which meshes with said first small gear wheel, and a second small gear wheel which is formed on one side of said large gear wheel and which meshes with said driving gear.

9. The automatic liquid soap dispenser as claimed in claim 1, wherein said movable blocking member includes a sealing block and a resilient element which normally biases said sealing block to block said through-hole of said second annular outward projection.

10. The automatic liquid soap dispenser as claimed in claim 9, wherein said resilient element is a compression spring.

11. The automatic liquid soap dispenser as claimed in claim 9, wherein said sealing block is a cylindrical pin.

* * * * *